US009506548B2

(12) United States Patent
Kinch

(10) Patent No.: US 9,506,548 B2
(45) Date of Patent: Nov. 29, 2016

(54) CONTROL VALVE AND METHOD OF CONTROLLING TORQUE CONVERTER LOCK-UP CLUTCH

(71) Applicant: Ford Global Technologies, LLC, Dearborn, MI (US)

(72) Inventor: Derek Kinch, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/205,999

(22) Filed: Mar. 12, 2014

(65) Prior Publication Data

US 2015/0260269 A1 Sep. 17, 2015

(51) Int. Cl.
| F16H 45/02 | (2006.01) |
| F16H 61/14 | (2006.01) |
| F16H 41/04 | (2006.01) |
| F16H 41/24 | (2006.01) |
| F16D 48/02 | (2006.01) |

(52) U.S. Cl.
CPC .............. *F16H 45/02* (2013.01); *F16H 41/04* (2013.01); *F16H 41/24* (2013.01); *F16D 2048/0221* (2013.01); *F16H 61/143* (2013.01)

(58) Field of Classification Search
CPC ........... F16D 2048/0221; F16D 48/02; F16D 61/143; F16H 45/02
See application file for complete search history.

(56) References Cited

U.S. PATENT DOCUMENTS

| 5,611,371 | A | | 3/1997 | Wirtz |
| 5,611,750 | A | | 3/1997 | Kono et al. |
| 5,637,053 | A | * | 6/1997 | Droste et al. ................... 477/62 |
| 5,669,473 | A | | 9/1997 | Long et al. |
| 5,701,982 | A | * | 12/1997 | Nakatani et al. .............. 192/3.3 |
| 5,755,638 | A | * | 5/1998 | Suzuki ........................... 477/62 |
| 6,019,203 | A | | 2/2000 | Patel et al. |
| 6,056,094 | A | | 5/2000 | Sakai |
| 6,622,835 | B2 | | 9/2003 | Moorman et al. |
| 6,990,996 | B2 | | 1/2006 | Stafford |
| 7,100,753 | B1 | | 9/2006 | Stafford |
| 7,104,273 | B1 | | 9/2006 | Stafford |
| 7,815,016 | B2 | | 10/2010 | Moorman |
| 7,828,128 | B2 | | 11/2010 | Frait et al. |
| 8,191,694 | B2 | * | 6/2012 | Soga .............................. 192/3.3 |
| 2002/0007857 | A1 | * | 1/2002 | Lou ......................... 137/625.65 |
| 2010/0264348 | A1 | * | 10/2010 | Kinch et al. .................. 251/321 |
| 2011/0011689 | A1 | * | 1/2011 | Sakamoto ...................... 192/3.3 |

* cited by examiner

Primary Examiner — Ramya Burgess
Assistant Examiner — Lillian Nguyen
(74) Attorney, Agent, or Firm — Diederiks & Whitelaw, PLC

(57) ABSTRACT

A motor vehicle includes a transmission having a control valve and a torque converter with a lock-up clutch. The control valve is configured to control both a mode and an apply pressure of the lock-up clutch. The control valve includes a valve body and a plunger moveable within the valve body. When the plunger is in a first position, the lock-up clutch is in a release mode and, when the plunger is in a second position, the lock-up clutch is in an apply mode and movement of the plunger relative to the second position controls the apply pressure.

16 Claims, 8 Drawing Sheets

CONTROL VALVE AND METHOD OF CONTROLLING TORQUE CONVERTER LOCK-UP CLUTCH

BACKGROUND OF THE INVENTION

The present invention pertains to a control valve for a lock-up clutch of a torque converter of a motor vehicle and, more particularly, to a control valve that controls both a mode of the lock-up clutch as well as an apply pressure.

Typically, two spool valves are used to control a lock-up clutch of a torque converter. In one such configuration, there is a valve for each mode of the lock-up clutch. In another configuration, one valve controls the mode while the other valve controls the apply pressure. In either configuration, it is difficult to discern whether there has been a failure of one of the valves, which can lead to component damage. Additionally, these configurations result in higher costs and increased package space and, in some cases, require additional failure mode mitigation capabilities. Therefore, there is a need in the art for a way to combine two torque converter lock-up clutch control valves so as to provide a single valve for controlling both a mode and an apply pressure of a torque converter lock-up clutch.

SUMMARY OF THE INVENTION

The present invention is directed to a motor vehicle including a transmission having a control valve and a torque converter with a lock-up clutch. The control valve is configured to control both a mode and an apply pressure of the lock-up clutch. The control valve includes a valve body and a plunger movable within the valve body. When the plunger is in a first position, the lock-up clutch is in a release mode and, when the plunger is in a second position, the lock-up clutch is in an apply mode and movement of the plunger relative to the second position controls the apply pressure.

In a preferred embodiment, the valve body has a plurality of ports so that transmission fluid can enter and exit the valve body. A first port is configured so that transmission fluid entering the port causes the plunger to move, in a first direction, from the first position to the second position so that lock-up clutch enters the apply mode. A second port is configured so that transmission fluid entering the second port causes the plunger to move in a second direction, which is opposite the first direction. Additionally, the plunger includes a first land having a first surface area and a second land having a second surface area, with the second surface area being greater than the first surface area. As a result, a greater force is applied to the second land than the first land when transmission fluid enters the second port, thereby causing the plunger to move in the second direction. The valve body also includes a spring located therein and configured to move the plunger in the second direction.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
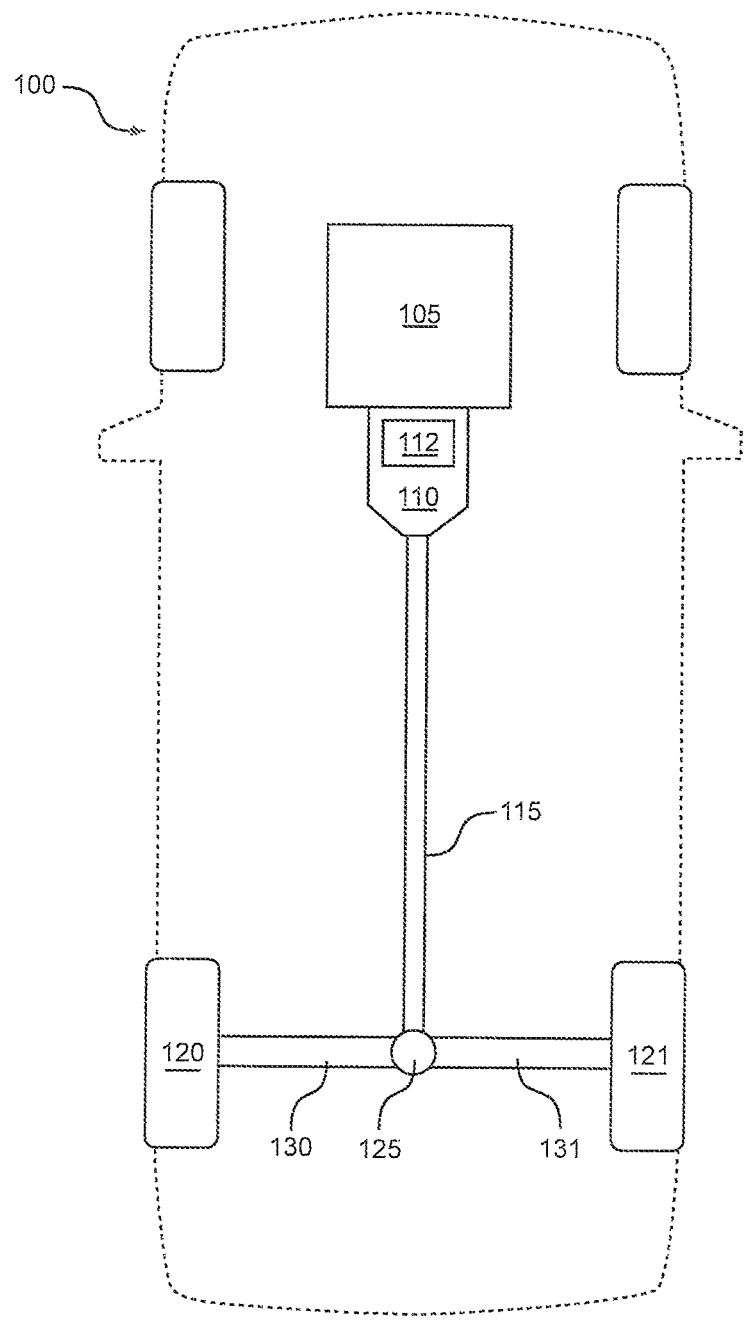
FIG. 1 is a schematic view of a motor vehicle constructed in accordance with the present invention.

With initial reference to FIG. 1, there is shown a motor vehicle 100 in accordance with the present invention. Vehicle 100 includes a power source 105, such as an internal combustion engine or an electric motor, connected to a transmission 110 having a control system 112 for controlling transmission 110. Power is transmitted from power source 105 to transmission 110 and then to a driveshaft 115, which transmits the power to rear wheels 120, 121 through a differential assembly 125 and half shafts 130, 131. In such a configuration, vehicle 100 is a rear-wheel drive vehicle. However, additional configurations are usable in connection with the present invention. For example, in other embodiments, vehicle 100 is front-, four- or all-wheel drive. In the four- and all-wheel drive embodiments, vehicle 100 would also include a transfer case, a second driveshaft, a second differential assembly and two more half shafts (not shown). Additionally, power source 105 does not need to be located in a front portion of vehicle 100, but can instead by located elsewhere, as in a rear- or a mid-engine embodiment.

Figure 2A:
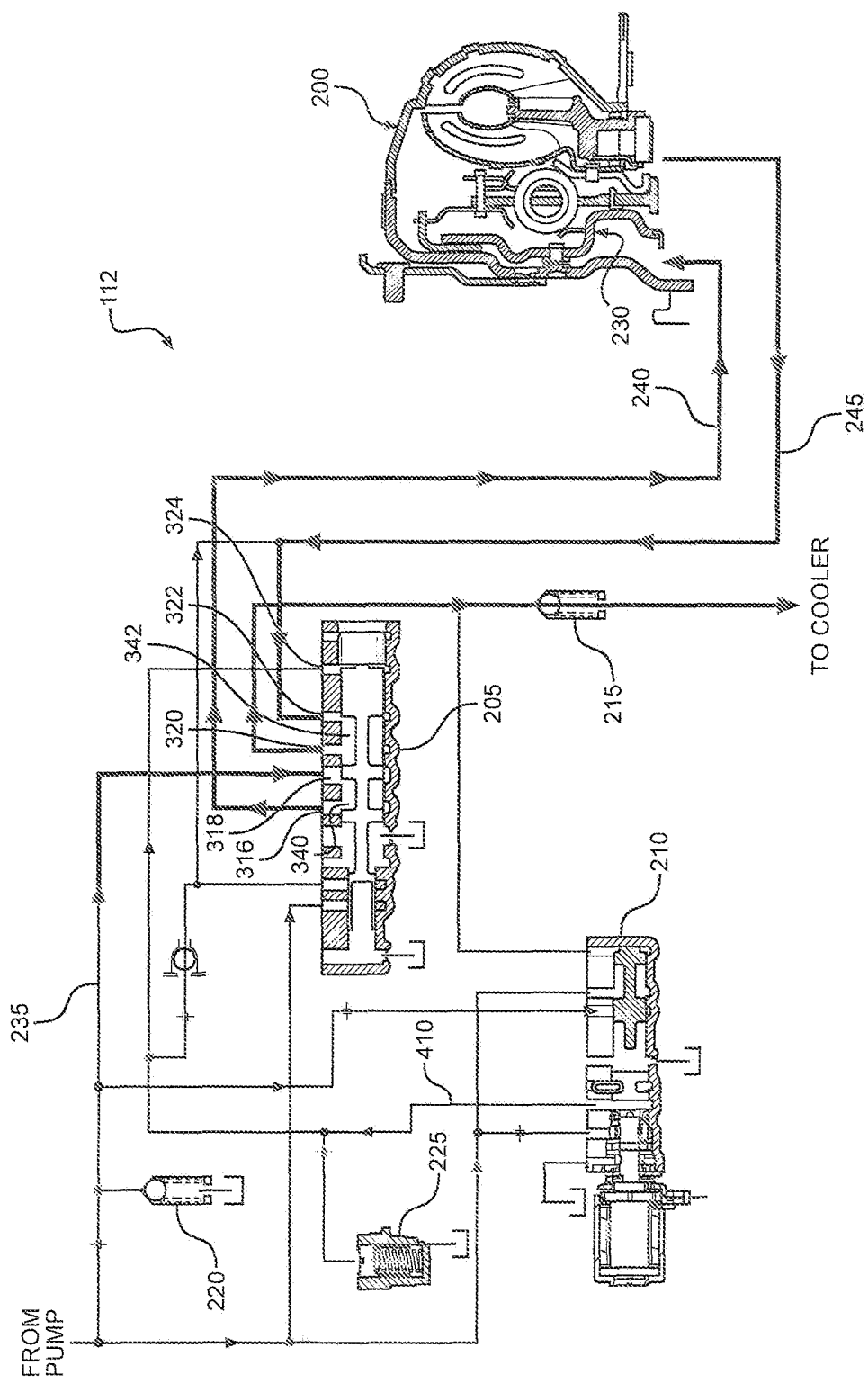
FIG. 2A is a schematic view of a portion of a transmission of the motor vehicle with a lock-up clutch of a torque converter in a release mode.
Figure 2B:
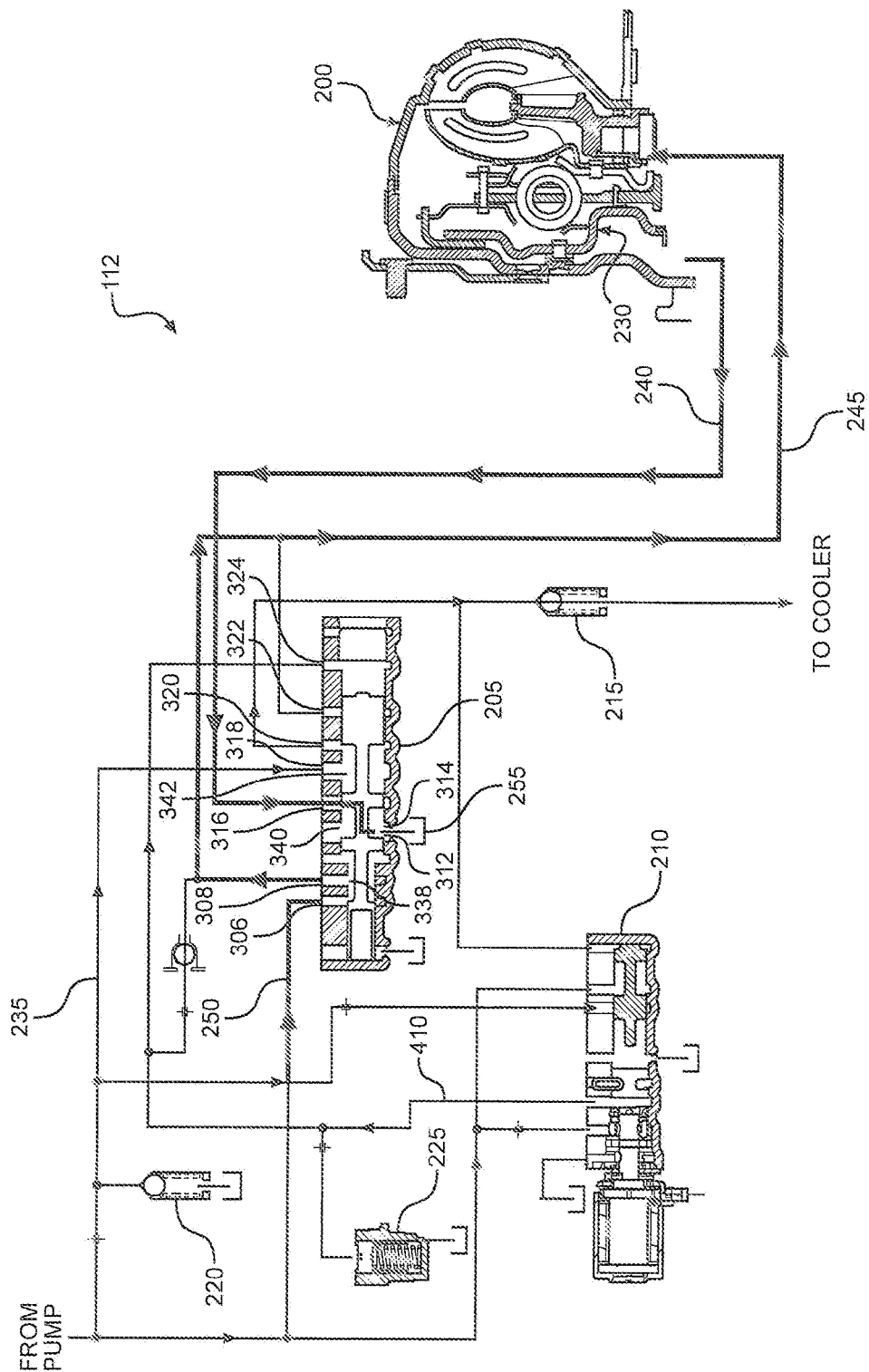
FIG. 2B is a schematic view of the portion of the transmission with the lock-up clutch in an apply mode.

Referring now to FIGS. 2A and 2B, schematic views showing a portion of transmission 110 are provided. Transmission 110 includes a torque converter 200 which has a control valve 205, a miniature direct-acting (MDA) solenoid valve 210, an anti-drainback device 215, a blowoff device 220 and a dampener 225. In FIG. 2A, a portion of a transmission fluid flow path associated with a release mode of a lock-up clutch 230 of torque converter 200 is indicated by bolded lines. Transmission fluid flows from a transmission pump (not shown), through a torque converter feed line 235 to control valve 205 and then to torque converter 200 through a release line 240. From torque converter 200, transmission fluid flows back to control valve 205 through an apply line 245. Transmission fluid then flows from control valve 205 to a cooler (not shown). In a similar manner, FIG. 2B shows a portion of a transmission fluid flow path associated with an apply mode of lock-up clutch 230. Transmission fluid flows from the transmission pump, through a pump out line 250 to control valve 205 and then to torque converter 200 through apply line 245. From torque converter 200, transmission fluid flows back to control valve 205 through release line 240. Transmission fluid then flows from control valve 205 to an exhaust 255, which leads to a transmission sump (not shown). Whether torque converter 200 is in the release mode or the apply mode is determined by control valve 205.

Figure 3A:
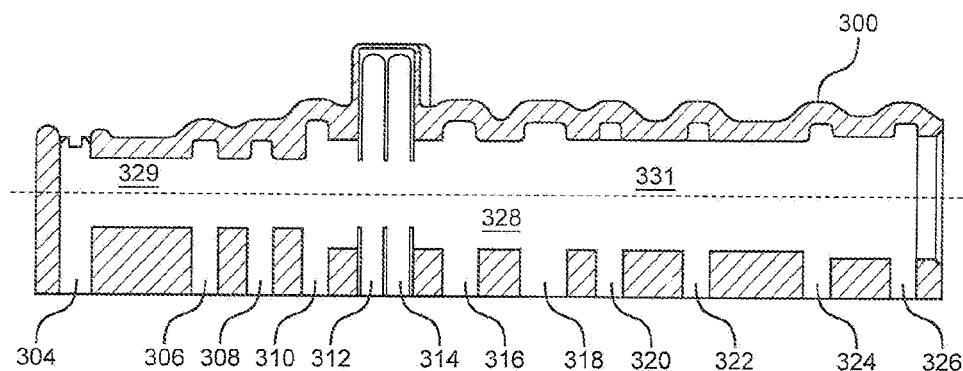
FIG. 3A is a cross-sectional view of a valve body in accordance with the present invention.
Figure 3B:
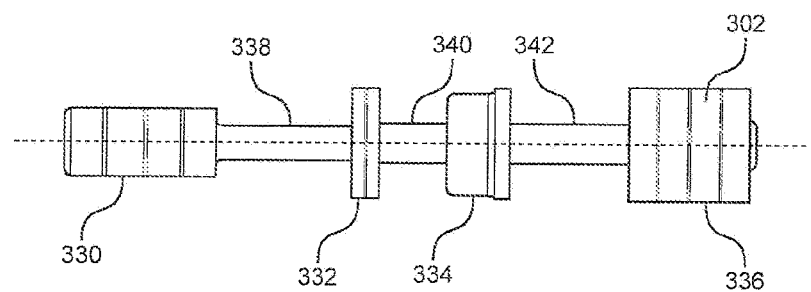
FIG. 3B is cross-sectional view of a valve plunger in accordance with the present invention.

FIGS. 3A and 3B show control valve 205 in greater detail. In particular, FIG. 3A shows a valve body 300 of control valve 205 while FIG. 3B shows a plunger 302 of control valve 205. Valve body 300 includes a number of ports through which transmission fluid flows as it enters and exits control valve 205. In the embodiment shown in FIG. 3A, valve body 300 has a first exhaust port 304, a pump out port 306, a first apply port 308, a second apply port 310, a second exhaust port 312, a third exhaust port 314, a release port 316, a torque converter feed port 318, a cooler port 320, a third apply port 322, an MDA port 324 and a return port 326. Valve body 300 also includes a central bore 328, which receives plunger 302. Central bore 328 is generally divided into a first section 329 having a first diameter and a second section 331 having a second diameter, with the second diameter being larger than the first diameter. Plunger 302 includes a first land 330, a second land 332, a third land 334 and a fourth land 336, which define a first groove 338, a second groove 340 and a third groove 342. When plunger 302 is located in bore 328 of valve body 300, transmission fluid can enter one or more of grooves 338, 340, 342 through one or more of ports 304, 306, 308, 310, 312, 314, 316, 318, 320, 322, 324, 326 and then exit through one or more of other ports 304, 306, 308, 310, 312, 314, 316, 318, 320, 322, 324, 326, as will be described in greater detail in connection with FIGS. 4A-H. First land 330 has a diameter that corresponds to the first diameter of bore 328 such that first land 330 travels within first section 328, while second land 332, third land 334 and fourth land 336 have diameters that correspond to the second diameter and travel within second section 331.

Figure 4A:
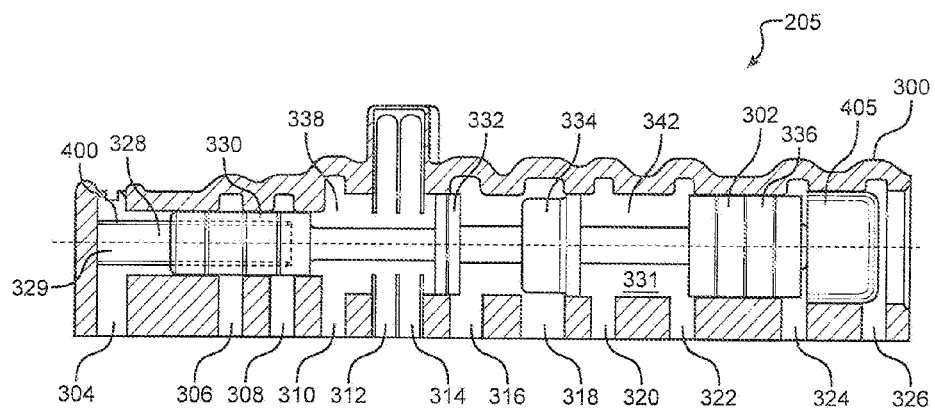
FIGS. 4A-H are cross-sectional views showing the valve plunger in various positions within the valve body.

FIG. 4A shows control valve 205 with plunger 302, a spring 400 and a bore plug 405 installed in valve body 300. This position of plunger 302 within valve body 300 represents an installed position. In other words, plunger 302 is located in this position after installation and until purposefully shifted leftward, against the action of spring 400 and away from bore plug 405, which limits rightward travel of plunger 302. This position also corresponds to the release mode of lock-up clutch 230 of torque converter 200. Accordingly, with reference to FIGS. 2A and 4A, transmission fluid flows from torque converter feed line 235 through torque converter feed port 318 into second groove 340 and then out of release port 316. Release port 316 is connected to release line 240 and, as a result, transmission fluid flows out of release port 316 through release line 240 and into torque converter 200. Transmission fluid then flows through apply line 245 and into third groove 342 through third apply port 322. Next, transmission fluid exits third groove 342 through cooler port 320 and flows to the cooler where the fluid is cooled.

To enter the apply mode, a signal is sent to MDA valve 210, shown in FIGS. 2A and 2B, which controls the flow of transmission fluid to MDA port 324. The signal directs MDA valve 210 to send transmission fluid, through an MDA line 410, to MDA port 324 such that plunger 302 is shifted to the left (with respect to FIGS. 4A-H) within bore 328 by transmission fluid entering through MDA port 324. Transmission fluid entering MDA port 324 acts in opposition to spring 400 to shift plunger 302 and, as a result, the position of plunger 302 is determined by the relative forces being applied by transmission fluid and spring 400. Ports 304, 306, 308, 310, 312, 314, 316, 318, 320, 322, 324, 326 are arranged along valve body 300 so that, during a transition between the modes, transmission fluid is properly routed such that, if plunger 302 becomes stuck, no components of transmission 110 are damaged. The various transition positions are shown in FIGS. 4B through 4F. Preferably, plunger 302 is only located in any of these positions temporarily as plunger 302 transitions from the release position shown in FIG. 4A (which defines a first position) to the apply position shown in FIG. 4G (which defines a second position).

Figure 4B:
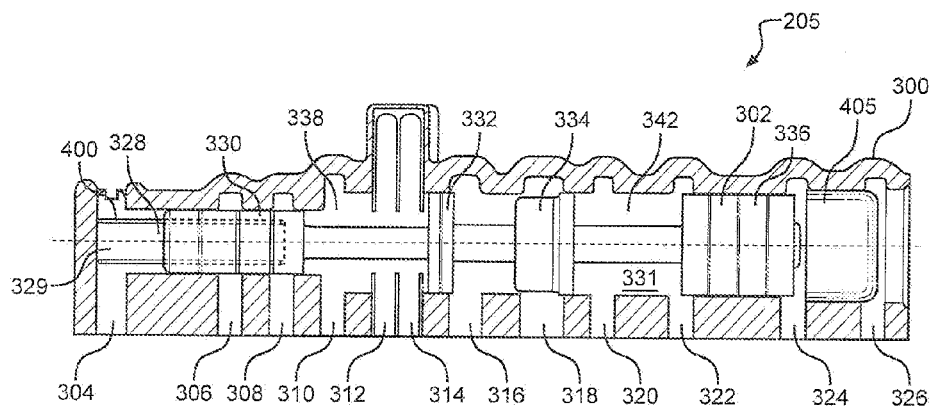
Figure 4C:
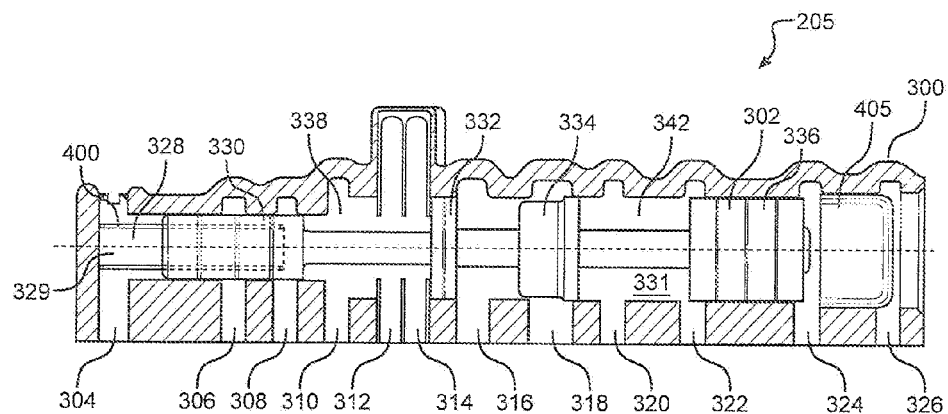
Figure 4D:
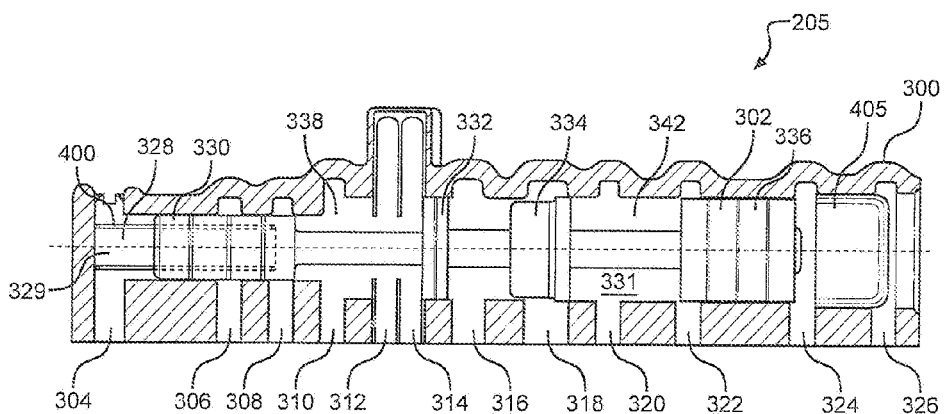
Figure 4E:
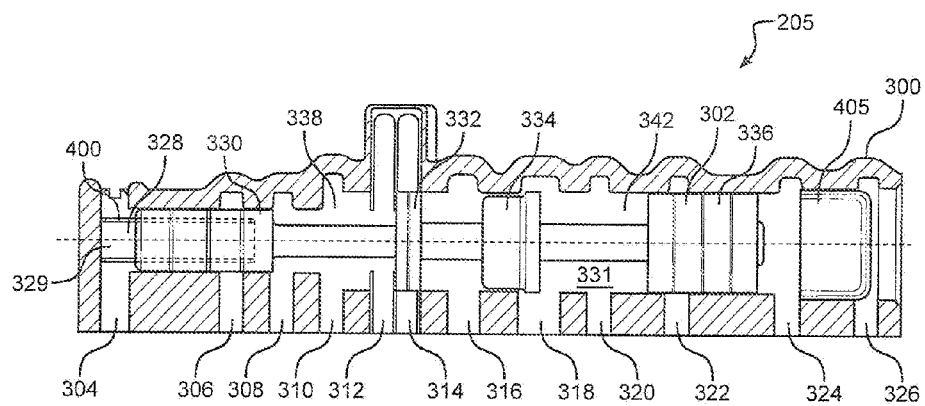
Figure 4F:
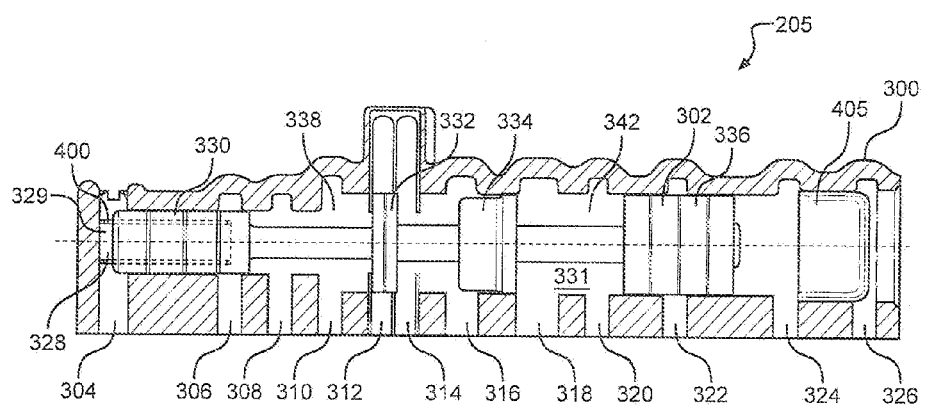

With reference to FIG. 4B, it can be seen that plunger 302 is positioned slightly to the left of the position shown in FIG. 4A, with the biggest change being that torque converter feed port 318 is now closed by third land 334. In FIG. 4C, plunger 302 is positioned slightly further to the left relative to the position shown in FIG. 4B, although none of ports 304-326 is newly opened or closed. As plunger 302 moves further to the left to the position shown in FIG. 4D, first apply port 308 begins to open and third apply port 322 begins to close. Next, in the position shown in FIG. 4E, first apply port 308 is open, third exhaust port 314 is closed by second land 332, torque converter feed port 318 is open and third apply port 322 is closed. As a result, transmission fluid flowing through torque converter feed line 235 is now directed into torque converter feed port 318, out of cooler port 320 and to the cooler. Further movement to the left results in the position shown in FIG. 4F, with second exhaust port 312 nearly closed and third exhaust port 314 open again. In this position, transmission fluid flows from release line 240, into release port 316 and then out third exhaust port 314 to exhaust 255.

Figure 4G:
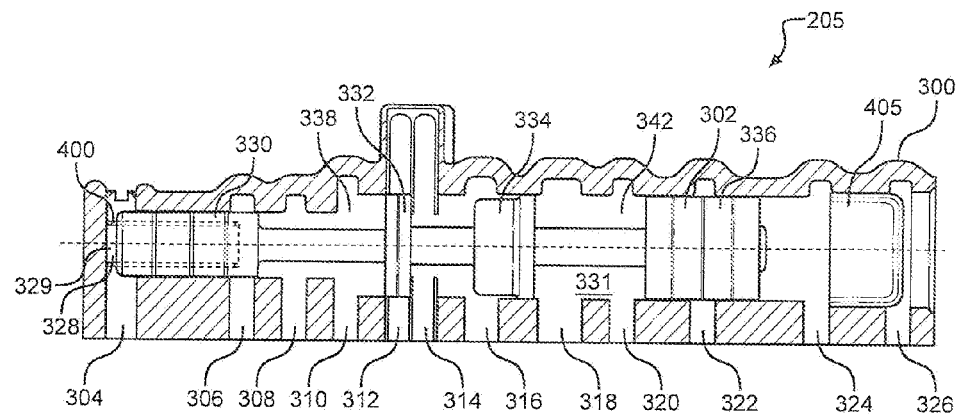
Figure 4H:
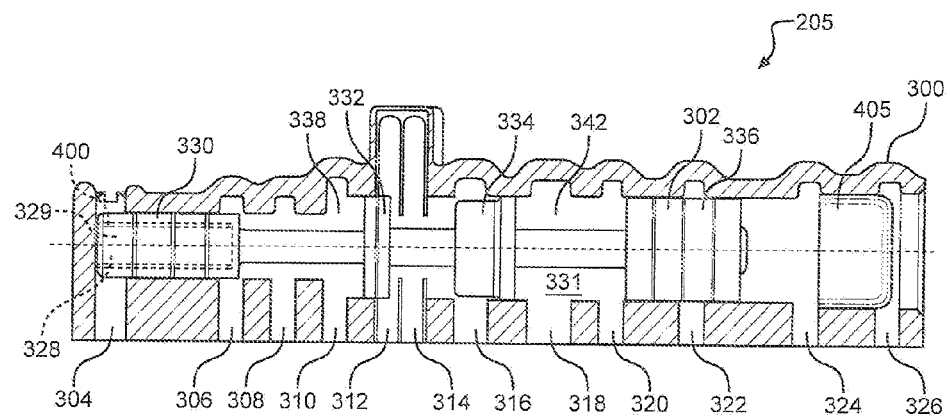

Turning now to FIGS. 4G and 4H, there is shown the two positions that represent the extent of the apply mode. In FIG. 4G, second exhaust port 312 is now closed by second land 332 and any further leftward movement will begin to open pump out port 306. FIG. 4H represents the full stroke position, with plunger 302 as far to the left as allowed by bore 328 and pump out port 306 open. When pump out port 306 is at least partially open, transmission fluid flows from the transmission pump through pump out line 245 and into first groove 338 through pump out port 306. Transmission fluid then flows out of first groove 338 through first apply port 308 and into apply line 245 so that transmission fluid flows to torque converter 200. Second apply port 310 is sealed such that transmission fluid does not exit valve body through second apply port 310. From torque converter 200, transmission fluid continues through release line 240 to release port 316 and into second groove 340. Transmission fluid then continues through second and third exhaust ports 312, 314 to exhaust 250.

The pressure applied in the apply mode is determined by the movement of plunger 302 back and forth between the positions shown in FIGS. 4G and 4H, and this movement is itself determined by the interaction between several forces. Specifically, as discussed above, each of spring 400 and MDA valve 210 (in the form of transmission fluid entering control valve 205 through MDA port 324) apply an opposing force to plunger 302. Additionally, transmission fluid entering groove 338 applies a greater force to land 332 than land 330 because the surface area on which transmission fluid acts is greater for land 332 than land 330. This difference in surface area is enabled by the change in diameter of bore 328 between first section 329 and second section 331 and the corresponding difference in diameters between land 330 and land 332. As a result, when transmission fluid enters groove 338 through pump out port 306 (as in FIG. 4H), the greater force being applied to land 332 causes plunger 302 to shift toward the right. This rightward movement eventually causes land 330 to close pump out port 306 (as in FIG. 4G), at which point plunger 302 will again shift back to the left due to the force applied by transmission fluid entering MDA port 324. As plunger 302 moves to the left, pump out port 306 is once again open, and the cycle repeats. The apply pressure is regulated by this cycling which, as explained above, is controlled by the interaction between spring 400, transmission fluid entering through MDA port 324 and the different forces applied to lands 330 and 332. In particular, to change the apply pressure during operation, the flow of transmission fluid to MDA port 324 through MDA line 410 is altered by MDA valve 210. Altering this flow changes the balance between spring 400, the forces applied to land 330 and 332 and the flow of transmission fluid through MDA port 324 and, as a result, it changes the apply pressure. Specifically, increased flow, and hence pressure, through MDA port 324 increases the apply pressure by inhibiting rightward movement of plunger 302. Similarly, decreased flow through MDA port 324 reduces the apply pressure. As a result, control valve 205 is able to control the pressure applied in the apply mode.

Based on the above, it should be readily apparent that the present invention provides a single control valve that controls both a mode and an apply pressure of a lock-up clutch of a torque converter. Although described with reference to preferred embodiments, it should be readily understood that various changes or modifications could be made to the invention without departing from the spirit thereof. For example, the order of the ports of the control valve could be altered. Additionally, the various components of the transmission itself could be rearranged. In general, the invention is only intended to be limited by the scope of the following claims.

The invention claimed is:

1. A transmission for a motor vehicle comprising:
a torque converter including a lock-up clutch;
a pump for supplying transmission fluid;
a first valve for receiving transmission fluid from the pump; and
a control valve including a control valve body and a plunger movable within the control valve body, the control valve body having a first port for receiving transmission fluid from the first valve and a second port for receiving transmission fluid from the pump, the control valve being configured so that:
when the lock-up clutch is in a release mode, the plunger is in a first position within the control valve body, and the second port is closed;
when the lock-up clutch enters an apply mode, the first valve is configured to send transmission fluid to the first port, the plunger reaches a second position within the control valve body, and the second port becomes partially open; and
after entering and while in the apply mode, movement of the plunger back and forth along the control valve body relative to the second position controls an amount of transmission fluid entering the second port and thereby controls an apply pressure of the lock-up clutch.

2. The transmission of claim 1, wherein the plunger has a first land and a second land, the first land having a first surface area and the second land having a second surface area greater than the first surface area, whereby a greater force is applied to the second land than the first land when transmission fluid enters the second port.

3. The transmission of claim 2, wherein the greater force applied to the second land causes the plunger to move toward the first position.

4. The transmission of claim 3, wherein the control valve further includes a spring located within the control valve body, the spring configured to cause the plunger to move toward the first position.

5. The transmission of claim 1, wherein, when the plunger is in a third position within the control valve body, the lock-up clutch is in the apply mode and movement of the plunger back and forth along the control valve body between the second and third positions controls the apply pressure of the lock-up clutch.

6. A control valve for controlling a lock-up clutch of a torque converter in a transmission of a motor vehicle comprising:
a control valve body and a plunger movable within the control valve body, the control valve body having a first port for receiving transmission fluid from a first valve and a second port for receiving transmission fluid from a pump, the control valve being configured so that:
when the lock-up clutch is in a release mode, the plunger is in a first position within the control valve body, and the second port is closed;
when the lock-up clutch enters an apply mode, the first valve is configured to send transmission fluid to the first port, the plunger reaches a second position within the control valve body, and the second port becomes partially open; and
after entering and while in the apply mode, movement of the plunger back and forth along the control valve body relative to the second position controls an amount of transmission fluid entering the second port and thereby controls an apply pressure of the lock-up clutch.

7. The control valve of claim 6, wherein the first valve is a solenoid valve.

8. The control valve of claim 6, wherein the plunger has a first land and a second land, the first land having a first surface area and the second land having a second surface area greater than the first surface area, whereby a greater force is applied to the second land than the first land when transmission fluid enters the second port.

9. The control valve of claim 8, wherein the greater force applied to the second land causes the plunger to move toward the first position.

10. The control valve of claim 9, further comprising a spring, the spring being located within the control valve body and configured to cause the plunger to move toward the first position.

11. The control valve of claim 6, wherein, when the plunger is in a third position within the control valve body, the lock-up clutch is in the apply mode and movement of the plunger back and forth along the control valve body between the second and third positions controls the apply pressure of the lock-up clutch.

12. The transmission of claim 1, wherein the first valve is a solenoid valve.

13. A method of controlling a lock-up clutch of a torque converter with a control valve, the control valve including a plunger and a control valve body having a first port for receiving transmission fluid from a first valve and a second port for receiving transmission fluid from a pump, the method comprising:
entering a release mode by pushing the plunger towards a first position within the control valve body and closing the second port;
entering an apply mode by signaling the first valve to send transmission fluid to the first port, pushing the plunger towards a second position within the control valve body so that the plunger reaches the second position and partially opens the second port; and after entering and while in the apply mode, moving the plunger back and forth along the control valve body relative to the second position to control an amount of transmission fluid entering the second port and an apply pressure of the lock-up clutch.

14. The method of claim 13, wherein the plunger has a first land and a second land, the first land having a first surface area and the second land having a second surface area greater than the first surface area, the method further comprising:

applying a greater force to the second land than to the first land when transmission fluid is directed into the second port to thereby move the plunger toward the first position.

15. The method of claim 14, wherein the control valve further includes a spring located within the control valve body, the method further comprising:

moving the plunger toward the first position with the spring.

16. The method of claim 13, further comprising:

entering the apply mode when the plunger is located in a third position within the control valve body, wherein moving the plunger back and forth along the control valve body between the second and third positions controls the apply pressure of the lock-up clutch.

* * * * *